United States Patent

[11] 3,545,814

[72] Inventor Hugh Grenville Margetts
    Birmingham, England
[21] Appl. No. 768,305
[22] Filed Oct. 17, 1968
[45] Patented Dec. 8, 1970
[73] Assignee Girling Limited
    Birmingham, England
[32] Priority Oct. 29, 1967
[33] Great Britain
[31] No. 48286/67

[54] BRAKE PRESSURE CONTROL VALVES
    1 Claim, 3 Drawing Figs.
[52] U.S. Cl. ................................... 303/6,
    60/54.5; 137/100; 188/152; 303/84
[51] Int. Cl. ................................... B60t 8/26
[50] Field of Search .......................... 303/6c, 84,
    84(A); 188/151.11, 152.11, 152.02

[56] References Cited
    UNITED STATES PATENTS
3,467,440  9/1969  Strien ........................... 303/6(C)

Primary Examiner—Milton Buchler
Assistant Examiner—John J. McLaughlin, Jr.
Attorneys—Scrivener, Parker, Scrivener and Clarke ABSTRACT: A fluid pressure operated dual braking system including two sources of fluid pressure arranged for simultaneous operation and respectively connected by separate pressure lines to the actuators for two brakes, or sets of brakes, has one of the pressure lines provided with a control valve which in response to pressure in the second pressure line operates to close the first pressure line. The control valve may be of the pressure limiting type, it may operate to reduce the rate of pressure increase at the outlet of the valve relative to that at the inlet. In either case, failure of the brakes controlled by the second pressure line results in the valve opening or remaining open, so that full pressure can be applied to the brakes controlled by the first pressure line.

3,545,814

BRAKE PRESSURE CONTROL VALVES

In order to obtain optimum brake utilisation in vehicle braking systems it is known to fit a pressure limiting or reducing valve in the line between a pressure source and one brake or group of brakes (usually the rear brakes) of a vehicle, to take account of weight transfer which takes place due to deceleration. In a dual or tandem braking system, in which different brakes, or groups of brakes, are actuated from separate pressure sources arranged for simultaneous operation, the limiting or reduction of pressure in one brake or group becomes a disadvantage in the event of a failure of the other brake or group.

The present invention relates to a pressure control valve designed to overcome this disadvantage.

The invention may be stated broadly as providing, in or for a fluid pressure operated dual braking system including two sources of fluid pressure arranged for simultaneous operation, a first pressure line connecting one source to an actuator for a first brake, a second pressure line connecting the other source to an actuator for a second brake, and a control valve in the first pressure line for opening and closing communication between the first source and the first actuator, including means normally holding the valve open and means responsive to pressure in the second control line for closing the valve.

The invention is applicable both to hydraulic and pneumatic pressure brake systems.

Some embodiments of the invention will now be described, by way of example only, with reference to the accompanying drawings, in which.

Figure 1:
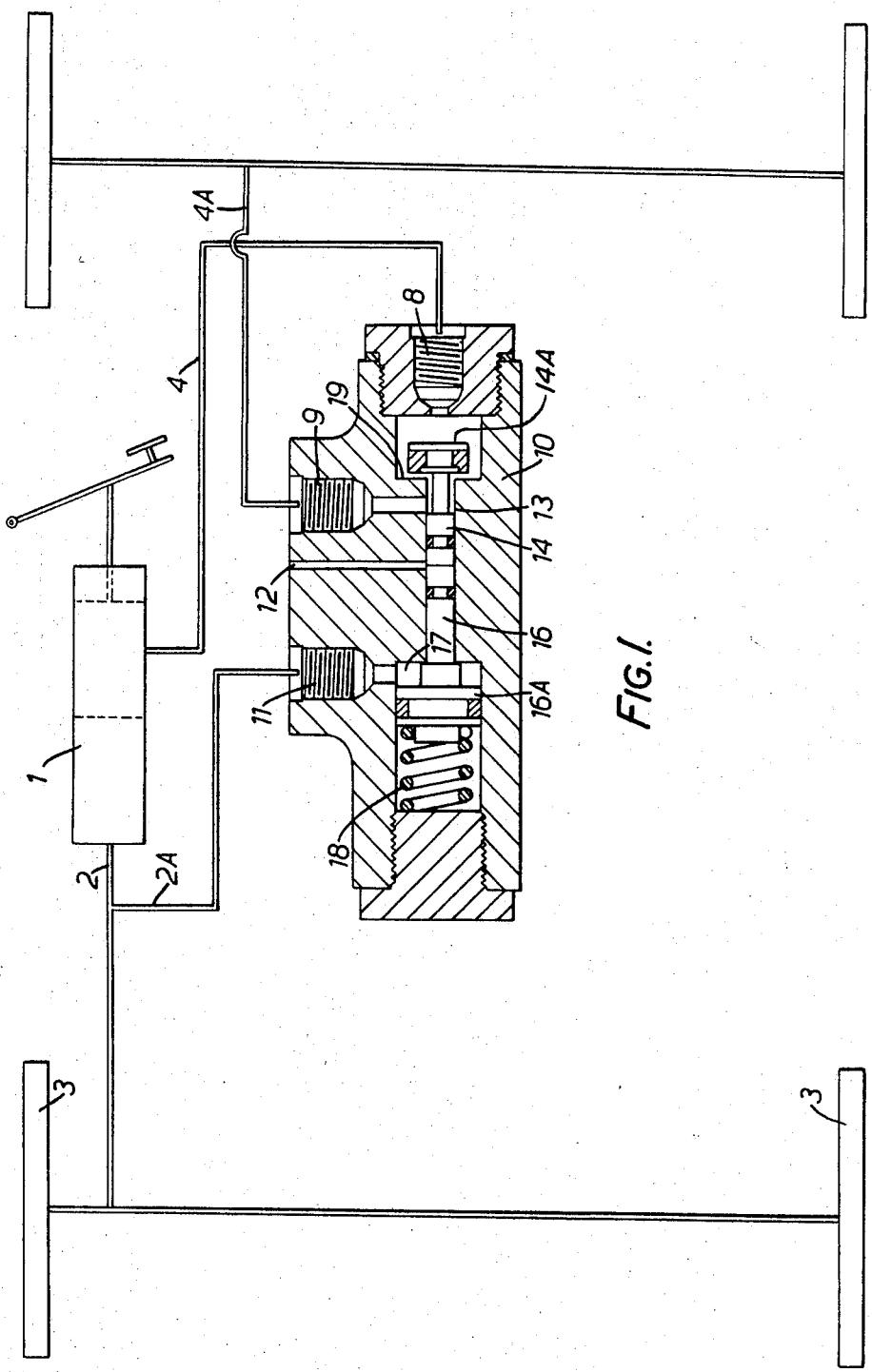
FIG. 1 is a diagrammatic representation of one form of braking system in accordance with the invention, the control valve included in the system being shown in axial section.

The dual brake system shown in FIG. 1 comprises a pedal operated tandem master cylinder 1 having one pressure line 4, 4a leading to the slave cylinders 6 for actuating the rear brakes of a vehicle through a control valve 7, and a second separate pressure line 2 leading direct to the actuators 3 for the front brakes. The line 4 is connected to an inlet 8 of the control valve, and the continuation 4A of the first pressure line leads from an outlet 9 to the rear brakes. The valve also has a control port 11 connected by a branch line 2A to the pressure line 2.

The control valve 7 comprises a housing 10 formed with the above mentioned inlet 8, outlet 9 and control port 11 and with a vent 12 to atmosphere, this vent facilitating initial assembly of the control valve. The housing is formed with a bore 13 in which are slidable the abutting stems of a valve member 14 and a piston 16. The head 16A of the piston works within a pressure space 17 communicating with the inlet 11 and is urged (to the right as shown) by a coil compression spring 18. The head 14A of the valve member is engageable with an annular seat 19 formed by a counterbore face of the housing but is normally held away from the seat by spring 18 acting through the piston 16 and the stem of valve 14.

In use, the parts of the control valve are in the positions illustrated until the brakes are applied by operation of the tandem master cylinders, whereupon fluid pressure is developed in lines 2, 2A and 4. As the valve head 14A is initially clear of seat 19, fluid flows freely past the valve to the outlet 9 and pressure line 4A to the rear brakes.

During this stage of pressure increase, the rightward force acting on the piston head 16A is solely that imposed by the spring 18; the leftward force is the sum of the forces due to the pressure in the space 17 acting on annular effective area of the piston head 16A, and the pressure in the inlet 8 acting on the cross-sectional area of the valve stem 14. When the latter forces have increased sufficiently to overcome the spring force, the piston 16A will move to the left and allow the valve 14 to close, thereby isolating the master cylinder from the rear brakes, the pressure at which is thereafter limited to that prevailing at the time of cutoff. Upon release of brake pressure, the spring 18 returns the parts to their illustrated positions.

Any failure of the front brake system which causes a loss of pressure from the pressure line 2 will result in the control valve remaining open, or returning to open position, so that maximum pressure without limitation can be transmitted through line 4, 4a to the rear brakes.

Figure 2:
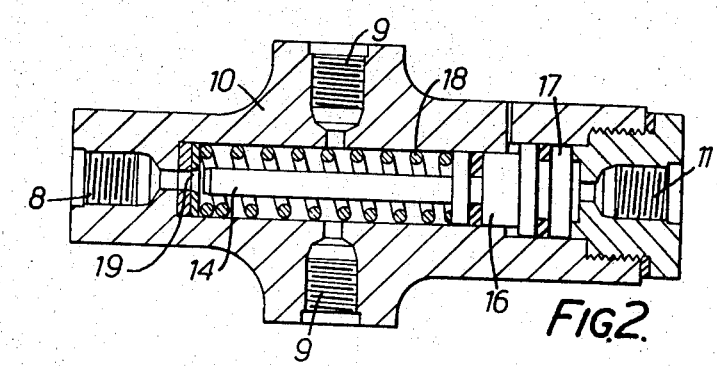
FIG. 2 is an axial section of an alternative form of control valve.

The control valve shown in FIG. 2 is similar in principle and mode of operation to that shown in FIG. 1, though its constructional form differs. In the construction of FIG. 2 the valve member 14 is constituted by an axial extension of the stepped piston 16. Corresponding parts of the two control valves being indicated by th the same reference numerals, further description of the control valve of FIG. 2 is deemed unnecessary.

Figure 3:
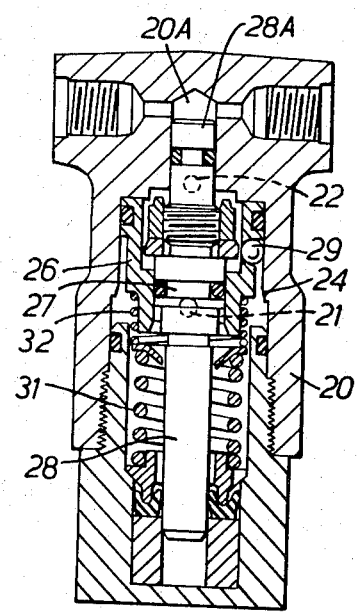
FIG. 3 is a similar view of a third form of valve.

The control valves shown in FIGS. 1 and 2 are of the pressure limiting type, but valve shown in FIG. 3 is a pressure reducer valve, which operates to reduce the rate of pressure increase at the outlet of the valve, relative to the rate of pressure increase at the corresponding inlet.

In FIG. 3, a different set of reference numerals is employed to avoid confusion. The control valve comprises a housing 20 having an inlet 21 and outlet 22 both communicating with a bore 24 in which slides a sleeve 26 sealed in the bore. A piston 27 working in the sleeve has a stem 28 exposed at its outer end to atmospheric pressure, and a second stem 28A exposed to the pressure in a pressure space 20A at one end of the housing 20. The sleeve 26 has a radial port forming a seat for a valve ball 29, which which is normally held off its seat by a collar on the piston 27, the parts being urged to their illustrated positions by coil compression springs 31 and 32.

In use, with the inlet and outlet 21 and 22 connected to one master cylinder space and the rear brakes, respectively, and the space 20A connected to the pressure line leading to the front brakes, and upon actuation of the master cylinder, pressure fluid initially flows from the inlet 21, past the valve 29 to the outlet 22. With the valve 29 open, the only fluid pressure tending to displace the piston is that acting in the space 20A, and when this reaches a predetermined level, it displaces the piston, relative to the sleeve against the action of the spring 31, thus moving the piston collar clear of the valve ball 29 and allowing it to seat. Thereupon, the inlet 21 is isolated from outlet 22, and any excess of inlet pressure over outlet pressure acts upon an annular area of the piston constituted by the step between the head of the piston and the stem 28 and tends to return the piston to its illustrated position and unseat the valve ball 29. The flow of fluid permitted when the valve is thus reopened reduces the pressure differential between inlet and outlet, so that the piston will again be moved clear of the valve ball and the valve will again close. These actions may be repeated several times in one braking operation, resulting in metered doses of pressure fluid being allowed to pass from the inlet 21 to outlet 22. Should the front line pressure fail, the valve will not "cut off" and the valve 29 will remain in its illustrated position to allow the full line pressure in the rear line to be transmitted through the control valve.

Many variations and modifications in the above described embodiments will, of course, be possible within the scope of the invention. It will, e.g. be possible to employ a diaphragm instead of a piston as the member responsive to pressure in the second pressure line, and other forms of pressure source may be employed, such as a pump.

I claim:

1. In or for a fluid pressure operated dual braking system including two sources of fluid pressure arranged for simultaneous operation, a first pressure line connecting one source to an actuator for a first brake, a second pressure line connecting the other source to an actuator for a second brake, and a control valve in the first pressure line for opening and closing communication between the first source and the first actuator, said control valve comprising a housing having an inlet connected to the first source, an outlet connected to the first actuator and a control port connected to the second pressure line; a piston in said housing exposed to pressure at said control port and movable between first and second position, spring means acting on said piston in opposition to the pressure at said control port to retain said piston in its first position but yielding in response to a predetermined pressure at said control port to enable said piston to move to its second position, a valve seat in the housing which affords communication between the inlet and outlet, a valve member cooperating with said seat, valve operating means carried by said piston and directly acting on said valve member for positively retaining it off its seat when said piston is in its first position, said valve member being constructed and arranged to be only movable into engagement with its seat to disconnect said inlet from said outlet solely in response to movement of said piston to its second position, said spring means being constructed and arranged to retain said piston in its first position and consequently to positively retain said valve off of its seat at all times so long as the pressure at said control port is below said predetermined value and irrespective of the pressure rise in said first line.